(12) United States Patent
Christian

(10) Patent No.: US 6,502,060 B1
(45) Date of Patent: Dec. 31, 2002

(54) PET CHRONOMETER AND IDENTIFICATION TAG

(75) Inventor: Lutrell M. Christian, Santa Monica, CA (US)

(73) Assignee: Petronics, Inc., Santa Monica, CA (US)

( * ) Notice: Subject to any disclaimer, the term of this patent is extended or adjusted under 35 U.S.C. 154(b) by 47 days.

(21) Appl. No.: 09/661,491

(22) Filed: Sep. 14, 2000

Related U.S. Application Data

(60) Provisional application No. 60/153,800, filed on Sep. 14, 1999.

(51) Int. Cl.$^7$ ............... G04B 19/24; G06F 15/00
(52) U.S. Cl. ............... 702/178; 345/1.1; 368/10; 368/28; 368/62; 374/142
(58) Field of Search ............... 702/79, 89, 125, 702/176, 178, 179, 187; 368/10, 11, 28, 41, 62, 63; 374/142; 345/1.1, 685; 119/858; 40/300

(56) References Cited

U.S. PATENT DOCUMENTS

| | | | | |
|---|---|---|---|---|
| 4,774,697 A | 9/1988 | Aihara | ............... | 368/41 |
| 4,976,548 A | 12/1990 | Tschanz | ............... | 368/277 |
| 5,012,229 A | 4/1991 | Lennon et al. | ............... | 345/1.1 |
| 5,023,850 A | 6/1991 | Metts et al. | ............... | 368/28 |
| 5,140,562 A | 8/1992 | Moore-Ede et al. | ............... | 368/62 |
| 5,355,839 A | 10/1994 | Mistry | ............... | 119/858 |
| 5,444,673 A | 8/1995 | Mathurin | ............... | 368/63 |
| 5,454,350 A | 10/1995 | Betheil | ............... | 119/858 |
| 5,484,205 A | 1/1996 | Grupp et al. | ............... | 374/142 |
| 5,583,830 A | 12/1996 | Okuyama | ............... | 368/11 |
| 5,724,316 A | 3/1998 | Brunts | ............... | 368/10 |
| 5,734,625 A | 3/1998 | Kondo | ............... | 368/10 |
| 5,752,335 A | 5/1998 | Shimogori et al. | ............... | 40/300 |
| 5,877,742 A | 3/1999 | Klink | ............... | 345/685 |

FOREIGN PATENT DOCUMENTS

| | | | | |
|---|---|---|---|---|
| FR | 2 669 443 | 5/1992 | ............... | 368/10 |

OTHER PUBLICATIONS

Casio Protrek GPS Watches web sheets, pp. 1–2. Sep. 14, 2000 (copyright 1999–2000 Web Watches).

*Primary Examiner*—John S. Hilten
*Assistant Examiner*—John Le
(74) *Attorney, Agent, or Firm*—Cislo & Thomas LLP

(57) ABSTRACT

A clock for the attachment of a dog's collar or the like that indicates the passage of time according to the dog's or pet's frame of reference. For example, the rate of passage of time may be such that for each human day of time passage, seven dog or pet days are reflected by the clock's display. Additional data, displays, and information may be carried, manipulated, entered and chosen by the use of user control buttons or the like. A battery may supply power to internal circuitry that drives a display of liquid crystals (LCD). The data carried by the pet chronometer and identification tag may be held in EEPROM such that a power failure does not erase the data. This is particularly useful for any health data or contact information that is incorporated or recorded into the pet chronometer and identification tag.

1 Claim, 6 Drawing Sheets

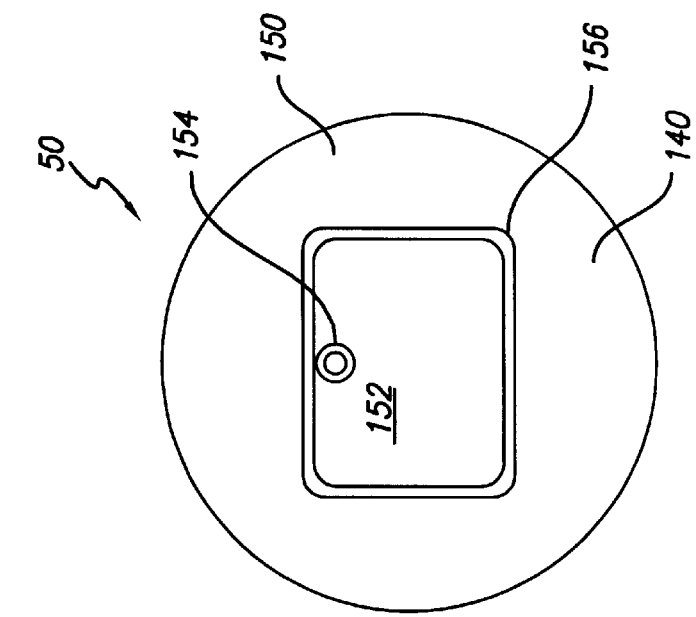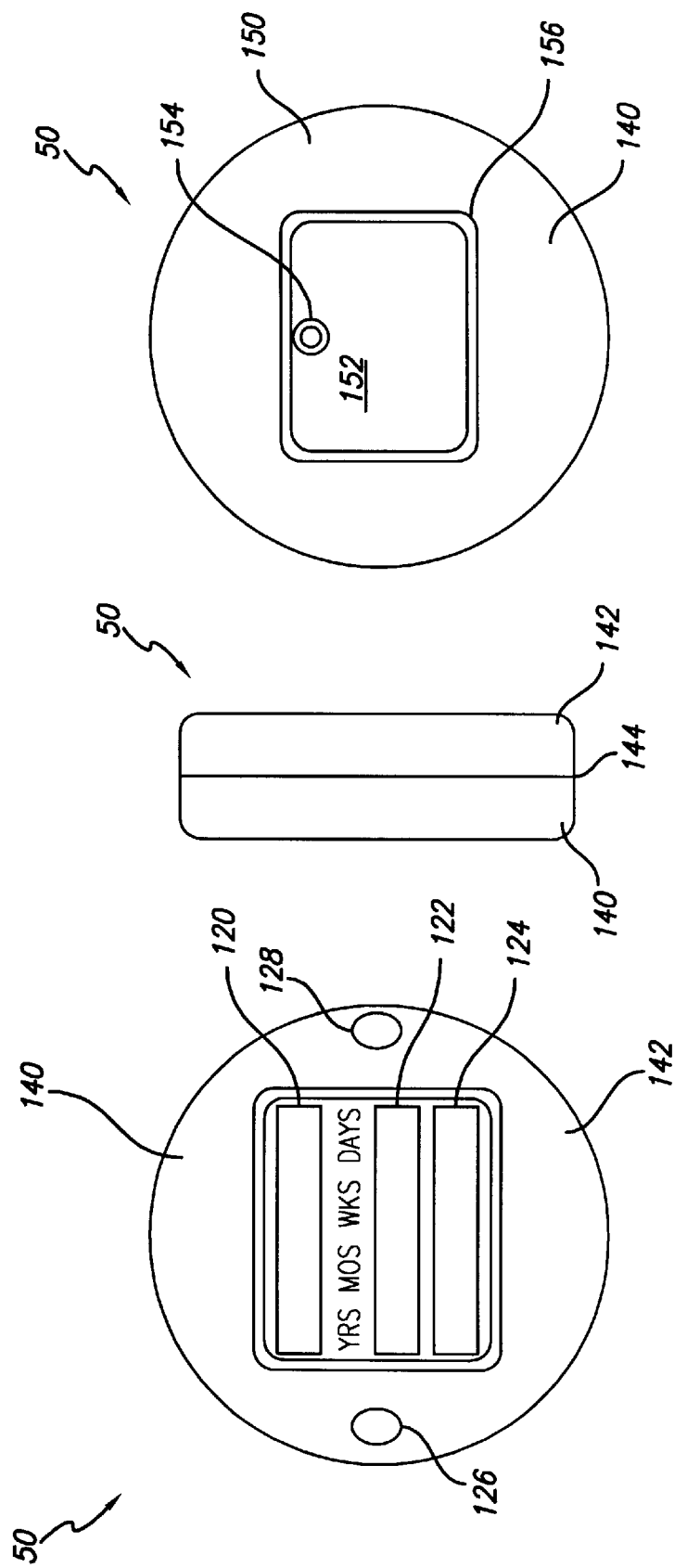

PET CHRONOMETER AND IDENTIFICATION TAG

CROSS-REFERENCES TO RELATED APPLICATIONS

This patent application is related to U.S. Provisional Patent Application Ser. No. 60/153,800 filed Sep. 14, 1999 for PET CLOCK, which application in its entirety is incorporated herein by this reference thereto.

BACKGROUND OF THE INVENTION

1. Field of the Invention

This invention relates to clocks and timekeeping devices, as well as electronic identification and information devices, and more particularly to a portable and self-contained clock that calculates the passage of time relative to the animal to which it pertains, such as the time passage seven times more quickly for a dog than for a human being.

2. Description of the Related Art

Clocks and timekeepers are generally known in the art. However, it is also well-known that time passes faster for different animals in that their life spans are shorter and longer than the ones for human beings. For example, the heart rate for a hummingbird is exceedingly fast indicating that an hour in human time for a hummingbird may be on the order of a, day or week. Similarly, dogs and cats experience time at a faster rate than humans, with a life span of approximately one-seventh that of a human being. Consequently, time passes approximately seven times as fast for a dog or cat, with one human day corresponding to a canine or feline week.

Prior attempts in the art include the following:

| Patent Number | Inventor | Date of Issue |
| --- | --- | --- |
| 5,877,742 | Klink | March 2, 1999 |
| 5,752,335 | Shimogori et al. | May 19, 1998 |
| 5,734,625 | Kondo | March 31, 1998 |
| 5,583,830 | Okuyama | December 10, 1996 |
| 5,454,350 | Betheil | October 3, 1995 |
| 5,444,673 | Mathurin | August 22, 1995 |
| 5,355,839 | Mistry | October 18, 1994 |
| 5,140,562 | Moore-Ede et al. | August 18, 1992 |
| 5,023,850 | Metts et al. | June 11, 1991 |
| 5,012,229 | Lennon et al. | April 30, 1991 |
| 4,976,548 | Tschanz | December 11, 1990 |
| 4,774,697 | Aihara | September 27, 1988 |

Of these patents, the following may be the most pertinent to the present invention.

Okuyama, U.S. Pat. No. 5,583,830

This reference is directed to an electronic wrist watch equipped with a sensor that can measure and display various sensed data. As shown in FIG. 1, a digital type display unit 2 is provided and is capable of displaying various data in a four line format. The first line of displayed data is the temperature. The second line is the atmospheric pressure or altitude. The third line shows hours and minutes, and the fourth line shows seconds. FIG. 3 is a schematic block diagram indicating the major portions of the electronic wrist watch. The electronic wrist watch includes a control unit containing a central processing unit, a ROM (read only memory), and a RAM (random access memory), connected to control unit 10. This unit possesses the capability to store the measured environmental data.

Metts et al., U.S. Pat. No. 5,023,850

This reference is directed to a clock for keeping time at a rate other than human time. This invention is a watch made to run at a time different than human time, such as a multiple of human time to correspond to the ratio of animal years per human year. FIG. 3 shows an embodiment of this clock in which human time and human date (and dog time or dog days) are indicated in a digital display, along with an analog display of current dog time in hours, minutes and days. The dog day represents the number of dog days elapsed during the current dog year. In FIG. 4, the push button 90 allows the user to change from dog time to human time and back again.

Klink, U.S. Pat. No. 5,877,742

This reference is directed to a medical identification bracelet. FIG. 2 is a perspective view of the medical information bracelet 10 showing both the display unit 20CA and a data transfer device 16. The electronic bracelet is set up using a programmable PC into which is entered up to 16K bits of medical and personal information about an individual. The programming station formats and transfers the formatted data into the bracelet via the interface device. The electronic bracelet has a liquid crystal view screen display which displays data in a scrolling fashion when a button is pressed. The information may be scrolled in either direction, paused, or set to run free.

Shimogori et al., U.S. Pat. No. 5,752,335

This reference is directed to an identification device for pets. This invention relates to a recording device in the shape of a dog biscuit or the like, wherein a voice chip records data input thereto, such as the owner's address and the pet's name. This invention is meant to be fastened to a collar to be worn around the pet's neck. By simply pressing a button which is self-evident on the tag, the pre-recorded message is played.

Mathurin, U.S. Pat. No. 5,444,673

This reference is directed to an audio controlled and activated wrist watch memory and device. The audio wrist watch is provided with numerous functional features, such as on/off, minutes, reset, next displayed message, previous displayed message, stop, time/date adjustment, save, erase, edit and train enabling the user to verbally record, verbally retrieve, and set alarms for appointments and tasks.

Mistry, U.S. Pat. No. 5,335,839

This reference is directed to an animal identification device utilizing a micro-cassette. The micro-cassette is meant to be attached to a conventional animal collar. The cassette contains information concerning the owner of the animal, the owner's location, and other pertinent identification information concerning the animal. The micro-cassette is enclosed in a waterproof holder which is attached to the collar.

Other patents exist in the art but are not seen as being more pertinent to the present invention than those set forth above.

It is well known that owners of dogs, cats, and other domestic pets often feel a close relationship or kinship with them, such that some anthropromorphization occurs with the animal owner tending to attribute human tendencies to the pet. While there may be some common shared tendencies between higher mammals, pet accoutrements and accessories such as dog sweaters, caps, and the like form a significant portion of the pet market economy beyond flea collars, medications, and veterinary services.

To this end, it would be advantageous to realize the market a clock or watch that related to the animal much like a wristwatch would to a human being. Up until the present day, such a device has not been available, in shortcoming remedied by the present invention.

SUMMARY OF THE INVENTION

The present invention provides a watch that is wearable around a collar for a dog or the like. The watch measures time according to the animal to which it is attached. Consequently, if the pet chronometer and identification tag of the present invention were attached to a dog's collar, it would measure time according to a dog's experience even though the dog would not be able to read the clock. As a novelty item, at times fancifully denominated as The Paw Pilot™, it would register one dog week for each human day and the corresponding display forms a novelty device that enhances play value and fun while also providing a unique identifier for the animal.

Using LCD or other low power display, a variety of types of information can be displayed. First and foremost is the display of the age of the pet in pet years. For example, the human one-year anniversary for a puppy would then register as seven years on the pet chronometer and identification tag.

Initially, the conventional time or "human time" could be shown in parallel or intermittently with the "pet time". Additionally, the temperature may be displayed as well as the pet's name, its hobbies (i.e., "frisbee" or "hunting", etc.), the pet's veterinarian's name and phone number and affectionate reminder displays such as "I need a hug."

Additionally, the pet chronometer and identification tag may form a fashion accessory for children or young adults depending on the fancies of the current day.

In order to effect the pet chronometer and identification tag of the present invention, a small microprocessor such as that incorporated in EEPROM or the like would drive the display driver to visually present the data or information in a friendly format. User controls allow the entry of data (such as the estimated birthdate of the pet) and allow the user to set options with respect to the pet chronometer and identification tag.

The entire pet chronometer and identification tag may be manufactured in a low cost and attractive manner, such that it becomes easily within the reach of most pet owner's discretionary budget. Not only does the pet chronometer and identification tag become a novelty item, but also can serve as an important identification device and an interactive reminder for the owner to offer the busy owner to give attention and affection to the pet.

OBJECTS OF THE INVENTION

It is an object of the present invention to provide a clock that measures a time according to a pet's rate of time passage (i.e., one human year equals seven dog years).

It is another object of the present invention to provide such a pet chronometer and identification tag that is small, compact, and easily wearable around a collar of a pet such as a dog.

It is yet another object of the present invention to provide a pet chronometer and identification tag that is easily adjusted, and requires low power.

It is yet another object of the present invention to provide a pet chronometer and identification tag that provides additional visual messages such that the identity of the pet and/or other trace or tracking information may be incorporated into the pet chronometer and identification tag.

These and other objects and advantages of the present invention will be apparent from a review of the following specification and accompanying drawings.

BRIEF DESCRIPTION OF THE DRAWINGS

FIG. 6 is a front elevational view of an embodiment of the pet chronometer and identification tag display similar to that of FIG. 5.

FIG. 7 is a side elevational view of the pet chronometer and identification tag of FIG. 6.

FIG. 8 is a rear elevational view of the pet chronometer and identification tag of FIG. 6.

DESCRIPTION OF THE PREFERRED EMBODIMENT(S)

Figure 1:
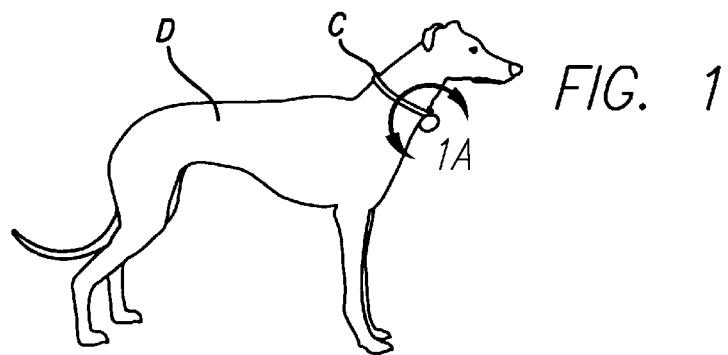
FIG. 1 is a diagrammatic display showing the pet chronometer and identification tag as attached to the collar of a dog.
Figure 1A:
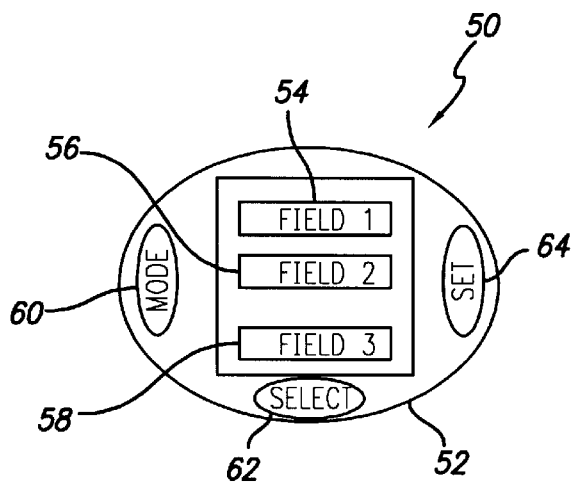
FIG. 1A is a front plan view of the pet chronometer and identification tag of the present invention.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The pet chronometer of the present invention is a unique digital pet-ID, pet-messaging, and lifecycle medallion having all the basic appearance and functionality of a conventional sports watch, except it is designed to be worn by a pet (dog). This product easily clips onto the "D-ring" of the dog's collar and/or onto the belt loop of a pair of pants or blue jeans.

The pet chronometer of the present invention may have the following physical attributes: a detachable, elliptical medallion, with a "sports watch" look, feel, dimensions, and weight; may be approximately 1.75 inches in diameter, 0.25 inch thick, and less than 2.0 ounces in weight; may have a watch-like casing being water-resistant and impact-resistant; and may have a detachable medallion design, so that it may easily clip onto a dog collar D-ring, key chain, belt loop, and/or necklace.

The pet chronometer of the present invention may feature two (2) or more lines/fields of easy-to-read alphanumeric LCD characters and may continually display the following information and pet-messages (in alternating 5-second intervals) or similar information or format: the digital display of conventional time-passage ("human" time); the ongoing calculation of the pet's estimated age, expressed in "dog time" or Doggie Standard Time™ where the rate of time-passage is seven times (7×) the rate of conventional time passage; and the ambient temperature.

Additional features may also be incorporated into the pet chronometer of the present invention. For example, an audio and/or visual alert may be used as a reminder for meals, medication, and/or vet visits. Additionally, digital display of several clever and "personalized" pet-messages (for communication from the pet to a human) may be provided, such as:

My name is ;

My phone number is ;

My favorite vet is ;

I love ;

I need a hug;

My hobby is chasing cats; and

Do you come here often?

As indicated above, the blanks are left open for the pet owner to fill in with the appropriate information.

The pet chronometer of the present invention may also have expanded applications that incorporate state-of-the-art GPS (Global Positioning System) technology. Such GPS technology may be used to identify and pinpoint the geographic location of the pet or other loved ones carrying the pet chronometer that run the risk of becoming lost or missing. Particularly, such a case may be especially present for cherished pets and/or family members (children and seniors).

The pet chronometer of the present invention may be encased in a water-resistant and shock-resistant plastic injection-molded casing, having a 2 fields of alphanumeric LCD pet-message display. The LCD display may have a resolution of 160 pixels by 80 pixels or 80 pixels by 40 pixels, by way of example only, and not of limitation.

On the outside edge of external casing of the pet chronometer of the present invention may be three (3) recessed buttons, entitled "MODE," "SELECT" and "SCROLL."

The pet-owner may push the MODE button whenever he/she wishes to start or stop programming the pet chronometer of the present invention. There may be four (4) separate modes through which the pet owner may cycle using the MODE button.

Accordingly, the pet chronometer of the present invention may contain, or provide, four (4) main functions or modes, as indicated and described herein. These modes include: a real-time clock (identical to a conventional digital watch); a Doggie Standard Time™ clock (time-passage calculated at seven times (7×) real-time); an external, or ambient, temperature reading of the dog's immediate environment; and "personalized" pet-messages that are communicated from the pet to a human, particularly the pet owner.

Regardless of the function or mode, the pet chronometer of the present invention may continuously run through a complete cycle, or loop, of up to (in one embodiment) ten (10) possible displays—using two (2) fields of the LCD display—which may allow each pet-message (within that cycle/loop) to be displayed for a duration of five (5) seconds before a subsequent pet-message is displayed.

The mode 'a' functions may be similar to those of a conventional watch, displaying the continuous passage of time with an optional conversion to year, month, and day.

Mode 'a' may also include functions for time-based audio and/or video alerts regarding meals, medication, and/or vet visits.

The mode 'b' functions may be identical to mode 'a,' with the exception that the internal clock is running at a rate that is seven (7) times faster than that of a conventional digital watch. In this mode, the passage of time is displayed as an ongoing and cumulative calculation/display of the pet's age in "dog years", or what can be referred to as Doggie Standard Time™. This continuous calculation/display of the pet's age (in terms of "dog years") is based on the pet-owner's original input of timing data regarding the pet's estimated age (in terms of "human years") at the time that the pet-owner initializes the pet chronometer of the present invention. In the mode 'b,' the ongoing and cumulative calculation/display of the pet's age in "dog years" or Doggie Standard Time™ may be displayed in terms of year, month, and day only.

Mode 'c' is a read-only temperature mode (ambient temperature, in one embodiment) that is actually displayed as part of the Mode 'a' section.

Mode 'd' may intermittently display one (1) message from a cycle/loop of up to (in one embodiment) seven (7) customized or pre-selected pet-messages, when selected. A complete listing of pre-selected and easy-to-input pet-message choices may be included with an instruction manual.

The pet-owner may push the SCROLL button whenever he/she wishes to begin to select input (in the form of personalized pet-messages) from a list of standard alphanumeric characters and/or from our list of pre-programmed pet-messages that the pet may wish to express to a human.

The pet-owner may push the SELECT button whenever he/she wishes to enter a certain alphanumeric character from the list of standard alphanumeric characters and/or whenever he/she wishes to enter a certain "phrase" from the list of various pre-programmed pet-messages that the pet may wish to express to a human.

Possible pet-messages may include such ones as indicated below:

My name is ;

My phone number is ;

My favorite vet is ;

I love ;

I need a hug;

My hobby is chasing cats; and

Do you come here often?

As indicated above, the blanks are left open for the pet owner to fill in with the appropriate information.

Referring now to the drawings, and as shown in FIG. 1, the pet chronometer and identification tag 50 of the present invention may be hung from a collar C of a dog D or other pet. The pet chronometer and identification tag 50 may have a display 52 that may have a variety of fields present therein. As shown in FIG. 1, the display 52 may have three fields, a top field 54, a middle field 56, and a lower field 58. Additionally, user input buttons are shown by which control over the display may be effected by the pet owner or other person.

The user controls may provide means by which the displays may be altered or configured as well as for the entry of data. A mode button 60 may control the mode of operation of the pet chronometer and identification tag 50. A select button 62 may select a certain displayed item or otherwise. The set button 64 may set the selected preferences of the pet's owner.

The display 52 as well as the top, middle, and lower fields 54, 56, 58 may be liquid crystal displays (LCDs). The user control buttons 60, 62, 64 may be spring biased or otherwise biased buttons that establish electrical contact when pressed. The pet chronometer and identification tag 50 may be made of sturdy plastic or the like as well as being water resistant, or waterproof, so that the dog or pet may splash through mud and water without the risk of injuring the pet chronometer and identification tag 50.

Figure 2:
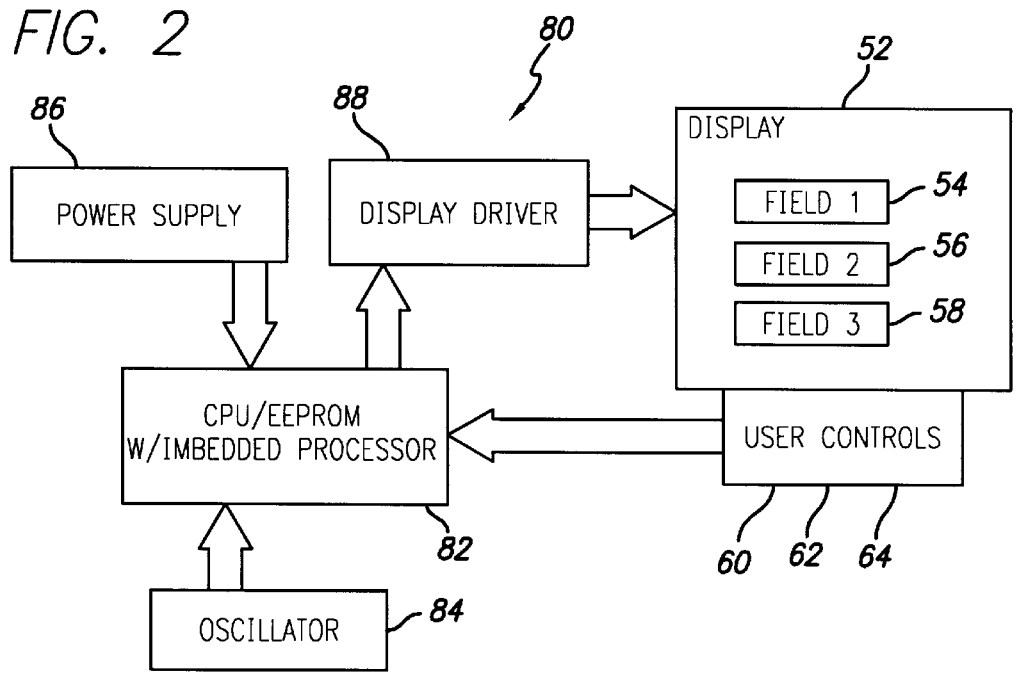
FIG. 2 is a flowchart diagram showing logical flow and control of signals and power throughout the pet chronometer and identification tag electronic circuitry.

As shown in FIG. 2, a rudimentary circuit structure is shown in block structure format. The internal circuitry as set forth in FIG. 2 is referred to herein generally by the reference number 80. The circuitry 80 generally focuses upon an EEPROM (electronically erasable programmable read-only memory) and microprocessor/CPU 82 which controls the functioning, operation, as well as storing data for the pet chronometer and identification tag 50. An imbedded microprocessor may be included with the EEPROM and/or CPU 82 to provide better operation. In fact, the operating capacity of the EEPROM/CPU 82 is limited only be available technology such that a broad scope of operational capabilities may be provided, including wireless and other operations.

An oscillator 84 (such as that furnished by a quartz crystal or the like), provides timing signals to the EEPROM and microprocessor 82. A power supply 86 in the form of a battery or the like supplies power to the EEPROM and microprocessor 82 as well as to the other components of the system, including the display 52. In order to intermediate the signals between the EEPROM and microprocessor 82, display driver 88 allows the translation of the microprocessor signals so as to appropriately drive the display 52 in its three fields 54, 56, 58.

The programming, control and display methods, algorithms, and features for the pet chronometer and identification tag 50 and its circuitry 80 are believed to be individually known in the art. The state of the art of programming is fairly sophisticated, such that programmable watches with alarms or the like are readily available. Recent technology has even allowed global positioning systems (GPS) to be incorporated into a wristwatch (such as the Casio® brand Pathfinder PTG-1 GPS wristwatch). Such devices could also be incorporated into the pet chronometer and identification tag 50 of the present invention and its circuitry 80.

The general features of the pet chronometer and identification tag 50 and its circuitry 80 have been generally described above. The remaining figures show alternative embodiments of the display and face portions of the pet chronometer and identification tag 50. These are indicated in more detail below.

Figure 3:
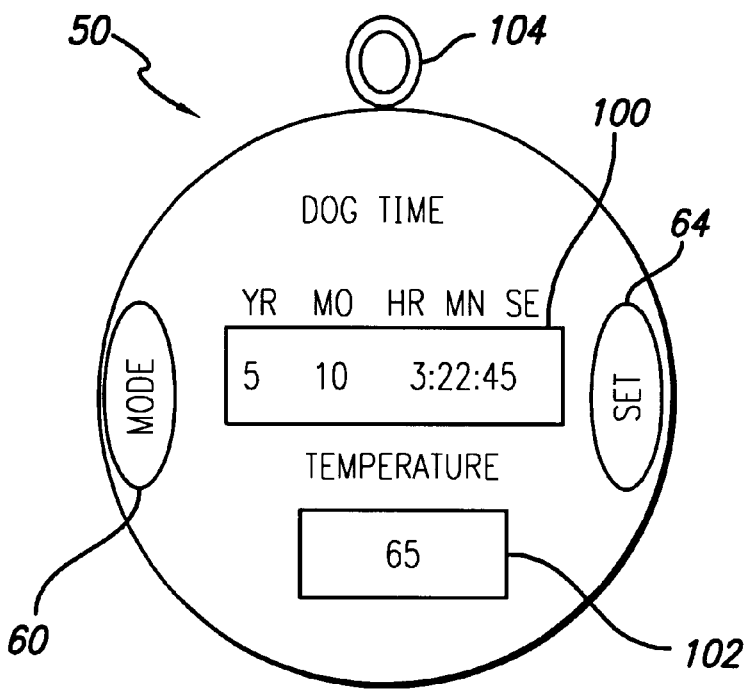
FIG. 3 is a sample display design for the pet chronometer and identification tag.

In FIG. 3, the pet chronometer and identification tag 50 may have a display field 100 that shows the time according to a dog's or pet's rate of passage. Unlike a common wristwatch or the like, the time display 100 of the pet chronometer and identification tag 50 shown in FIG. 3 indicates not only hours, minutes and seconds, but also years and months. In an alternative embodiment, days of the week can be shown as passing for each 24/7 or approximately 3.42 human hours. Additionally, the temperature may be shown in a temperature display 102 with the thermometer (not shown) coupled to the EEPROM and microprocessor 82 in order to provide for the proper display and the temperature display 102. Additionally, as shown in FIG. 1, a mode button or switch 60 may be present as may be a set button or switch 64.

In order to allow the attachment of the pet chronometer and identification tag 50 to a dog's or other pet's collar, a ring or the like 104 may be present at the top of the pet chronometer and identification tag 50.

Figure 4:
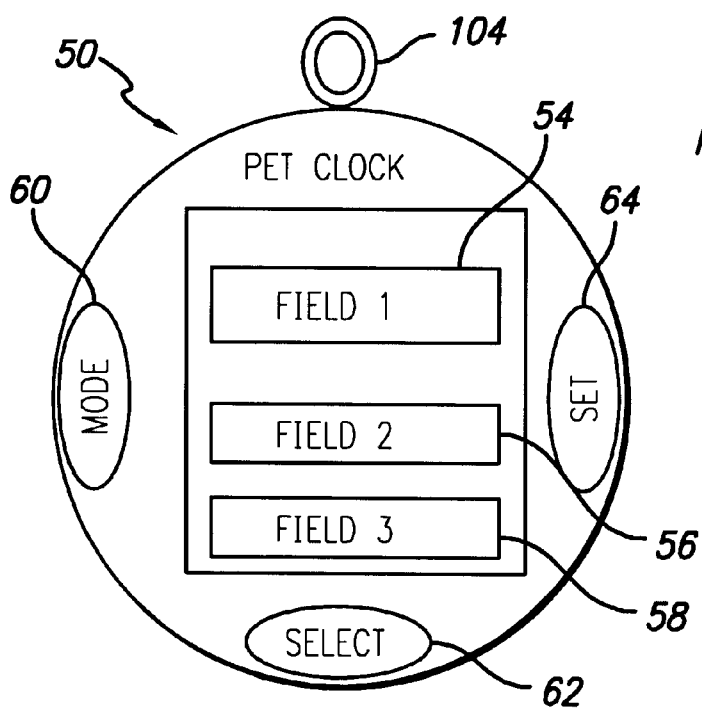
FIG. 4 is multiple-function display diagram of the pet chronometer and identification tag.

FIG. 4 is an alternative embodiment of the pet chronometer and identification tag 50 of the present invention. This embodiment is similar to that as shown in FIG. 1 where the pet chronometer and identification tag 50 may have a top field 54, a middle field 56, and a bottom field 58, as well as having mode 60, select 62, and set 64 buttons or switches.

Figure 5:
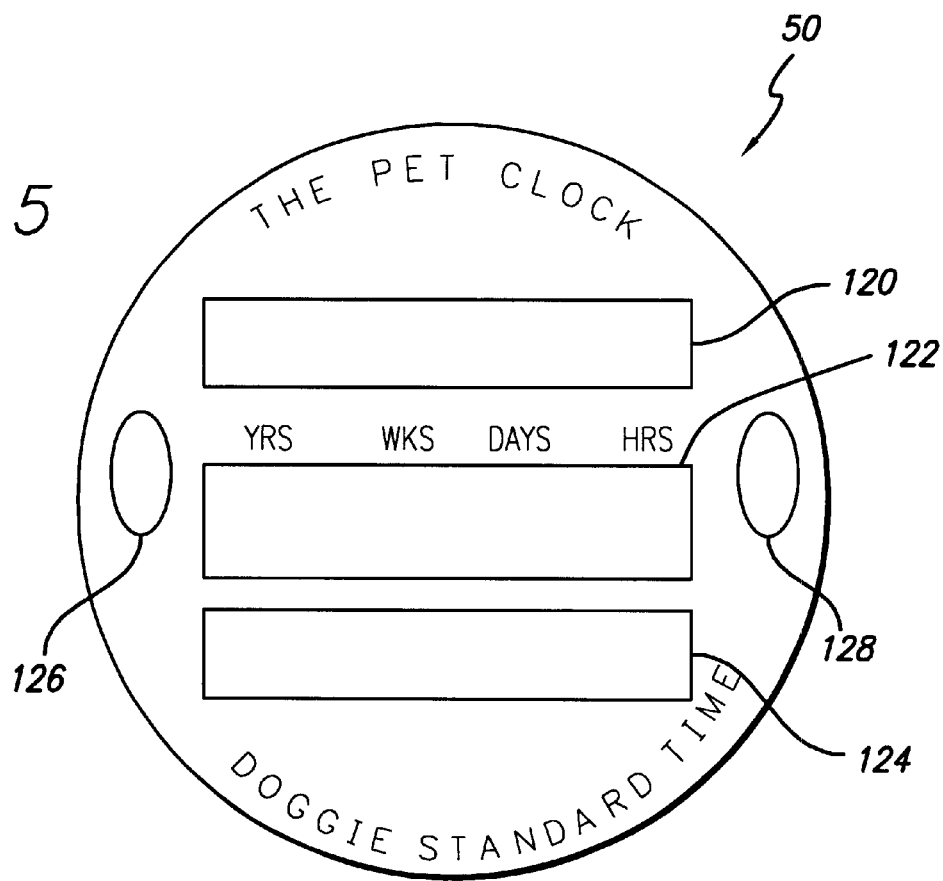
FIG. 5 is an alternative display format for the pet chronometer and identification tag.
Figure 9:
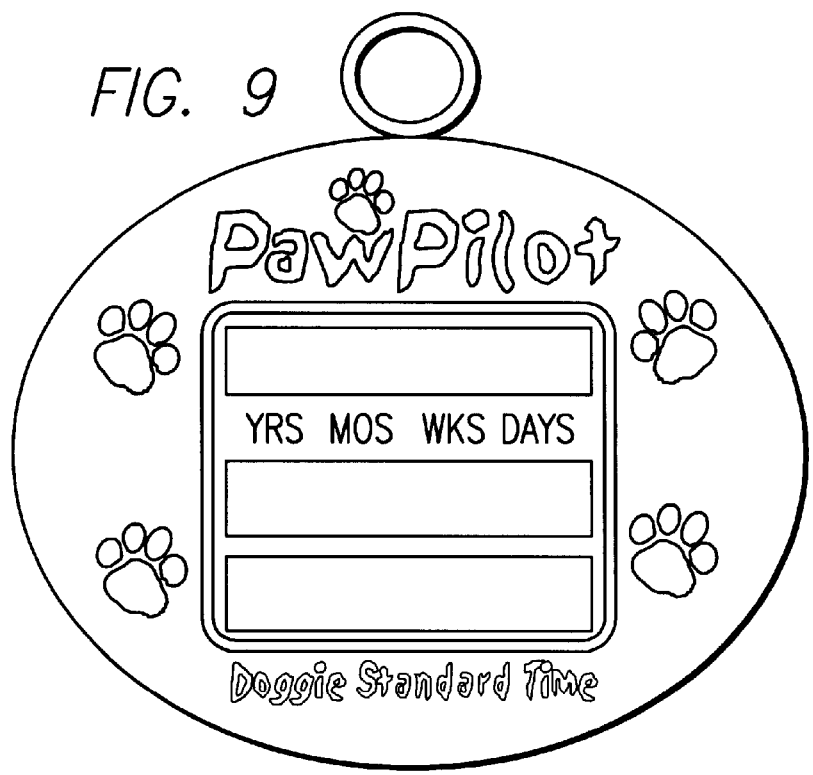
FIGS. 9–12 show front views of alternative embodiments of the present invention.
Figure 10:
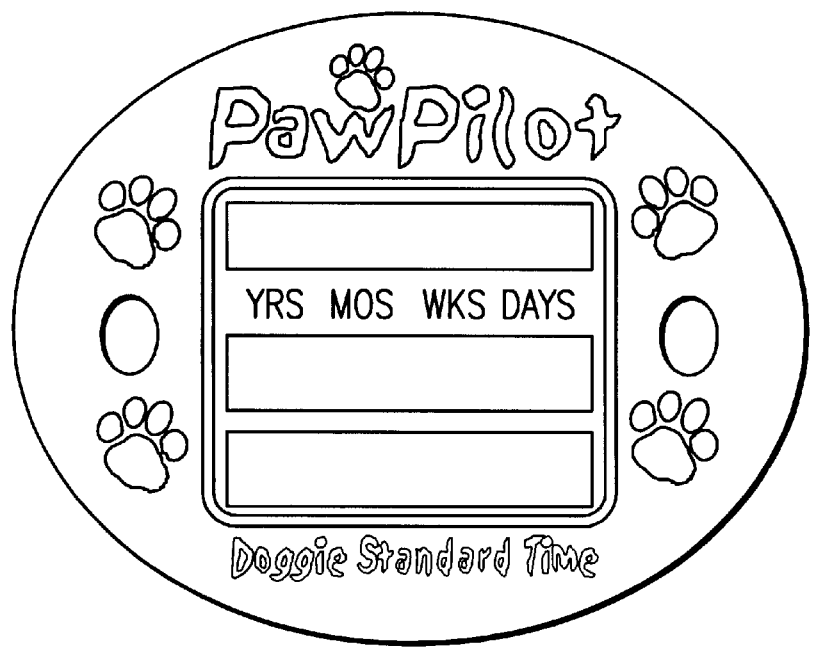
Figure 11:
Figure 12:
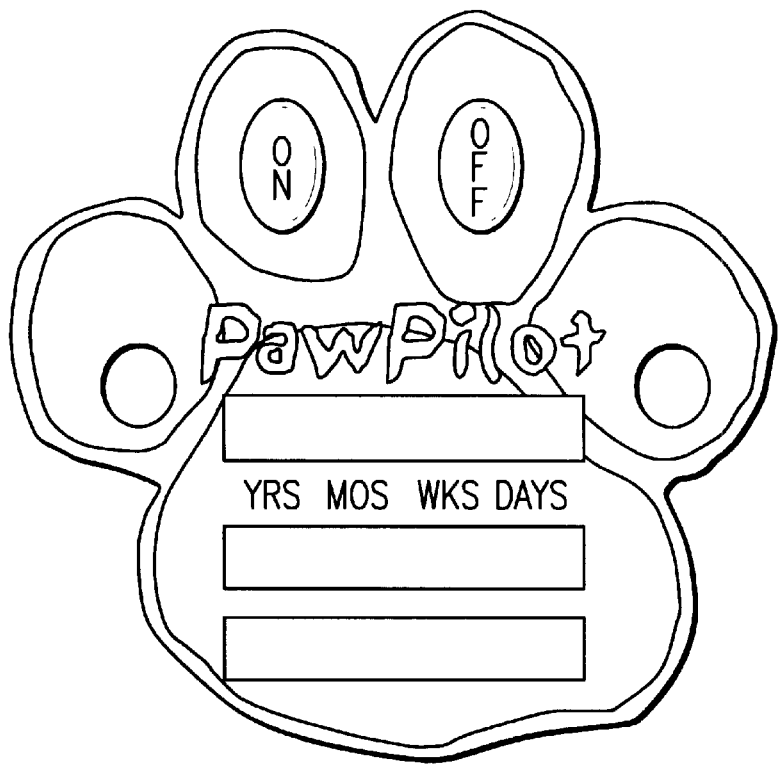

FIG. 5 shows an alternative embodiment of the pet chronometer and identification tag 50 of the present invention having a top display field 120, a middle time display field 122, and a lower display field 124. The display fields may present a variety of visual information data according to the programming of the pet chronometer and identification tag 50 and its circuitry 80. Additionally, control buttons or the like may be used in order to control and select the operation of the pet chronometer and identification tag 50 as shown in FIG. 5. In FIG. 5, a left control button 126 is matched by a right control button 128. The function of the right and left control buttons 126 and 128 may be assigned according to user or designer preferences.

FIGS. 6, 7, and 8 show a variety of views for a pet chronometer and identification tag similar to that as one shown in FIG. 5. The face 140 of the pet chronometer and identification tag 50 shown in FIG. 6 is generally similar to that as shown in FIG. 5. Top, middle, and bottom display fields 120, 122, and 124, respectively, are shown in FIG. 6. As for the middle time display field 122 of FIG. 5, the time shown may be that of the age of the dog or pet in, for example, dog years, dog months, dog weeks, dog days, and dog hours. According to the calculation above, each dog day is approximately 24/7 human hours.

FIG. 6 also shows left and right control buttons 126, 128 similar to that shown in FIG. 5.

In FIG. 7, a side view of the pet chronometer and identification tag 50 is shown. The pet chronometer and identification tag 50 may be made of similar halves, for purposes of description a left half 140 and a right half 142. The left and right halves 140, 142 may be of modules or construction for manufacturing efficiency. A seam 144 may be present between the left half 140 of the pet chronometer and identification tag 50 and the right half 142. A gasket or the like may be used to provide a water resistant seal between the left and right halves 140, 142.

FIG. 8 shows the rear face 150. A battery panel 152 is held shut by a latch or closure 154. A seam or gasket 156 may be present between the battery panel 152 and the rear half 140 of the pet chronometer and identification tag 50.

Small batteries such as those used for cameras or the like may form the power supply 86 for the pet chronometer and identification tag 50. Due to the power requirements for the electronic circuitry 80 as well as the display 52, long battery life may be realized by the pet chronometer and identification tag 50 of the present invention such that the battery needs only replacing for every human year or every two human years.

Having described the features and construction of the pet chronometer and identification tag 50 of the present invention, features, advantages, and operation are set forth below. Generally, the pet chronometer and identification tag 50 is designed for mass marketing and distribution purposes, a strong complement to its utility. The pet chronometer and identification tag 50 may be an attachable or clip-on elliptical medallion such as those shown in the drawings. Additionally, not only may the pet chronometer and identification tag 50 clip on to a dog collar C, but also to a key chain or belt loop. The pet chronometer and identification tag 50 may be brightly colored, and incorporate light-reflective material such that headlights or lights may easily reflect off it thereby giving greater visibility to the wearer of the pet chronometer and identification tag 50 at night or in the dark. The covering of the pet chronometer and identification tag 50 may be of durable plastic or the like to ensure a water resistant seal. Additionally, the cage should provide some impact resistance in order to allow the pet chronometer and identification tag 50 of the present invention to be knocked around or dropped without injuring it. Display icons may be used such as those that might illustrate love, affection, or a bond between humans and pets. One such display may be that of a human hand shaking a dog's paw.

The EEPROM circuitry 82 of the pet chronometer and identification tag 50 may retain data such that a loss of power (as when switching batteries) does not create a data loss in the pet chronometer and identification tag 50. The user buttons 60, 62, 64 and the like may be recessed, such that they may only be activated by a pen or pencil point or other sufficiently pointed object.

In the embodiments where the pet chronometer and identification tag 50 may have three display fields (FIGS. 1, 4, 5, and 6), the display fields may be used (in one such embodiment) as follows. The top field 54 may indicate the display of the passage of conventional or human time for seven seconds out of every 10-second interval. Alternatively, the top field 54 may display the environmental temperature and give a warning (such as with an optional speaker, beeper, or piezoelectric buzzer) that the temperature is below 32° F. or above 95° F., temperatures for which animals such as canines may suffer distress. This environmental temperature display may be present for 3 seconds out of every 10, alternating with the conventional time display.

For normal temperature ranges, the middle portion of the top display 54 may be used. However, if the temperature is out of the comfort range as set forth above, asterisks may appear flanking the middle display as well as the accompanying audio alert.

For the middle display 56, the middle display 56 may be a more prominent alpha-numeric LCD display indicating and displaying time as experienced by the pet, such as a dog. For purposes of description herein, such pet-related time is indicated by the trademarked term Doggy Standard Time™ or DST™. This display of Doggy Standard Time™ in the middle field 56 is calculated and displayed as the cumulative passages of time based on a rate that is seven times the conventional human time. In order to achieve this display, the dog's estimated birth date is entered into the pet chronometer and identification tag 50 as by the user buttons 60, 62, 64. Consequently, the approximate age of the dog is shown in the more prominent middle field 56. The middle field 56 may continually calculate and display the passage of time in the animal's time frame.

The bottom field 58 may display a series or selectable information display. When alternated, the displays may be made in 3-second intervals. For example, the dog's name may follow a display of the text, "My Name." Subsequently, "My Hobby" may be followed by a display of "Frisbee" or "Hunting," or "Chasing Cats," etc. "My Vet" may be displayed followed by the vet's name and phone number. In a humorous and playful embodiment consistent with the nature of the pet chronometer and identification tag 50 of the present invention, the display of "I need a hug" may be displayed occasionally in conjunction with an audio alarm to remind the pet's owner to devote attention and affection to the pet.

As the progress of technology continues, the pet chronometer and identification tag 50 of the present invention may provide a small database in the form of an actual electronic dog tag or the like that allows data, particularly health data and vet appointments, to accompany the dog. This provides ready identification should the dog get lost, as beyond the indication of the vet's name and phone number, the owner's name and phone number may also be listed. It is within the contemplation of the present invention that the owner's e-mail address be included in the data carried by the pet chronometer and identification tag 50.

Additionally, state-of-the art ID chip technology may be incorporated into the pet chronometer and identification tag 50 or its casing. Such a pet ID chip may be injected into the actual watch casing and held in a small compartment with a rubber membrane covering to further enhance ID/tracking capabilities of the present invention. The ID chip technology may require some user or owner input, and use of the "Home Again" skin insert ID chip manufactured by Schering-Plough or variations thereof may serve to good advantage.

FIGS. 9–12 show front views of alternative embodiments of the present invention.

While the present invention has been described with regards to particular embodiments, it is recognized that additional variations of the present invention may be devised without departing from the inventive concept.

One such alternative embodiment includes different versions of the pet chronometer and identification tag of the present invention. With such different versions, alternative messages may be given, as in different languages or dialects. Additionally, the pet owner may input his/her selected data into the pet chronometer and identification tag of the present invention via the available buttons, a scanning device, a PC keyboard/PC (via USB, serial or other available connection), or the like. With respect to the incorporated, miniaturized GPS technology within the pet chronometer and identification tag of the present invention, imbedded wiring may be used in the pet collar as a transponding antenna and allow the tracking and/or location of lost or missing animals/persons carrying the pet chronometer and identification tag of the resent invention. Persons may find that the pet chronometer and identification tag of the resent invention provides many benefits with respect to such GPS-related features.

What is claimed is:

1. A pet chronometer and identification tag for displaying an age of a pet according to a time scale of the pet, comprising:

a central processor for executing instructions;

memory, said memory coupled to said central processor and storing data including data regarding a date of birth for the pet;

identification data, said identification data stored in said memory and indicating identifying information regarding the pet;

an oscillator, said oscillator coupled to said central processor and providing timing signals to said central processor;

a display, said display coupled to said central processor and displaying data;

a temperature sensor, said temperature sensor coupled to said central processor and transmitting a temperature signal to said central processor;

said central processor transmitting a temperature display signal to said display in response to said temperature signal;

said display displaying a temperature display reflecting said temperature signal of said temperature sensor so that temperature may be sensed by the pet chronometer and reflected by said display;

a GPS (Global Positioning System) transponder, said GPS transponder coupled to said central processor, said GPS transponder detecting a location of the pet chronometer and transmitting a location signal indicating said location;

reminder data, said reminder data stored in said memory and indicating a reminder of an event regarding the pet, said reminder data having an activation time;

an alerting system, said alerting system engaged upon reaching said activation time so that an alert may be given for reminders selectably retained by the pet chronometer;

a user control, said user control coupled to said central processor and controlling data displayed by said display;

said central processor calculating passages of time according to the pet's time scale;

said central processor calculating the age of the pet according to said pet's birthdate and the pet's time scale; and said display displaying the pet's age according to the pet's time scale; whereby the pet's age according to the pet's time scale is easily determined by inspecting said display.

* * * * *